US012620288B2

(12) United States Patent
 Meyer

(10) Patent No.: US 12,620,288 B2
(45) Date of Patent: May 5, 2026

(54) ELECTRONIC GAMING MACHINE AND SYSTEM WITH A GAME ACTION REEL STRIP CONTROLLING SYMBOL EVALUATION AND SELECTION

(71) Applicant: Aristocrat Technologies Australia Pty Limited, North Ryde (AU)

(72) Inventor: Jason Meyer, Wyoming (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/383,269

(22) Filed: Oct. 24, 2023

(65) Prior Publication Data

US 2024/0054853 A1 Feb. 15, 2024

Related U.S. Application Data

(63) Continuation of application No. 17/389,303, filed on Jul. 29, 2021, now Pat. No. 11,830,313.

(30) Foreign Application Priority Data

Jul. 30, 2020 (AU) ................................ 2020902684
Sep. 16, 2020 (AU) ................................ 2020233681

(51) Int. Cl.
    *G07F 17/32* (2006.01)
    *G06F 7/58* (2006.01)
(52) U.S. Cl.
    CPC .......... *G07F 17/3213* (2013.01); *G06F 7/588* (2013.01); *G07F 17/3244* (2013.01); *G07F 17/3267* (2013.01)

(58) Field of Classification Search
    CPC ............. G07F 17/3213; G07F 17/3244; G07F 17/3267; G06F 7/588
    See application file for complete search history.

(56) References Cited

U.S. PATENT DOCUMENTS

| | | | |
|---|---|---|---|
| 5,393,057 A | 2/1995 | Marnell, II | |
| 5,482,289 A | 1/1996 | Weingardt | |
| 5,584,763 A * | 12/1996 | Kelly ........................ A63F 5/04 | |
| | | | 463/16 |
| 5,647,798 A | 7/1997 | Falciglia | |
| 5,935,002 A | 8/1999 | Falciglia | |
| 6,461,241 B1 | 10/2002 | Webb | |
| 6,609,973 B1 | 8/2003 | Weiss | |

(Continued)

OTHER PUBLICATIONS

Office Action dated Oct. 5, 2020 for U.S. Appl. No. 16/531,904 (pp. 1-18).

(Continued)

*Primary Examiner* — Jeffrey K Wong
(74) *Attorney, Agent, or Firm* — ALG Intellectual Property, LLC

(57) ABSTRACT

A gaming device comprises a display operable to display prize value symbols and a game action symbol selected. A processor initiates a game action associated with the game action symbol selected. The game action corresponds to either a further selection of prize value symbols or the prize value symbols displayed. The processor also selects, when one further selection of prize value symbols is to be made, a prize value symbol, and provides an award amount based on the prize value symbols in a quantity of display positions selected.

19 Claims, 11 Drawing Sheets

(56) References Cited

U.S. PATENT DOCUMENTS

| | | | |
|---|---|---|---|
| 6,656,044 | B1 | 12/2003 | Lewis |
| 6,764,398 | B2 | 7/2004 | Stone |
| 6,840,858 | B2 | 1/2005 | Adams |
| 8,241,103 | B2 | 8/2012 | Yarbrough |
| 8,425,303 | B2 | 4/2013 | Kennedy |
| 9,251,667 | B2 | 2/2016 | Marks |
| D768,160 | S | 10/2016 | Mcrae |
| D768,661 | S | 10/2016 | Mcrae |
| D773,495 | S | 12/2016 | Mcrae |
| D790,563 | S | 6/2017 | Lam |
| D863,344 | S | 10/2019 | Ashworth |
| D874,489 | S | 2/2020 | Ofstad |
| 10,777,039 | B1 | 9/2020 | Paotrakul |
| D925,552 | S | 7/2021 | Tuomey |
| D938,440 | S | 12/2021 | Hawkins |
| 2002/0045472 | A1 | 4/2002 | Adams |
| 2002/0177478 | A1 | 11/2002 | Glasson |
| 2004/0266509 | A1 | 12/2004 | Bennett |
| 2005/0056995 | A1* | 3/2005 | Tempest .................. G07F 17/34 463/20 |
| 2005/0236774 | A1* | 10/2005 | Loewenstein ........... G07F 17/32 273/303 |
| 2006/0084491 | A1 | 4/2006 | DiCarlo |
| 2006/0160603 | A1 | 7/2006 | Lulek |
| 2006/0252493 | A1 | 11/2006 | Tribout |
| 2007/0099695 | A1* | 5/2007 | Wilson .................... G07F 17/34 463/25 |
| 2007/0232379 | A1 | 10/2007 | Falciglia |
| 2008/0146346 | A1* | 6/2008 | Hardy .................. G07F 17/329 463/16 |
| 2009/0270163 | A1* | 10/2009 | Mitelman ............... G07F 17/32 463/20 |
| 2010/0120489 | A1 | 5/2010 | Meyer |
| 2010/0203945 | A1 | 8/2010 | Pitocchelli |
| 2010/0203948 | A1* | 8/2010 | Falciglia, Sr. ...... G07F 17/3265 463/20 |
| 2010/0227668 | A1* | 9/2010 | Scibetta .............. G07F 17/3293 463/25 |
| 2011/0028201 | A1 | 2/2011 | Warner |
| 2011/0117989 | A1 | 5/2011 | Kennedy |
| 2012/0122561 | A1 | 5/2012 | Hedrick |
| 2012/0270631 | A1 | 10/2012 | Graves |
| 2013/0157741 | A1 | 6/2013 | Pacey |
| 2013/0244787 | A1* | 9/2013 | Hafezi ................ G07F 17/3276 463/42 |
| 2014/0114890 | A1* | 4/2014 | Fujimaki ................ G06N 20/00 706/12 |
| 2015/0248807 | A1 | 9/2015 | Berman |
| 2015/0348371 | A1* | 12/2015 | Blazevic ............... G07F 17/322 463/11 |
| 2016/0104345 | A1* | 4/2016 | MacGregor ......... G07F 17/3239 463/20 |
| 2016/0358424 | A1* | 12/2016 | Thomas .............. G07F 17/3272 |
| 2018/0130285 | A1* | 5/2018 | Ang .................... G07F 17/3244 |
| 2018/0268659 | A1* | 9/2018 | Chesworth .......... G07F 17/3267 |
| 2019/0096168 | A1 | 3/2019 | Salmon |
| 2019/0096188 | A1 | 3/2019 | Tran |
| 2019/0139371 | A1* | 5/2019 | Lamb .................. G07F 17/3244 |
| 2020/0005600 | A1 | 1/2020 | Marks |
| 2020/0090449 | A1* | 3/2020 | Rajput .................. G06F 16/532 |
| 2020/0273293 | A1 | 8/2020 | Sanborn |
| 2021/0043038 | A1 | 2/2021 | Marks |
| 2021/0082248 | A1* | 3/2021 | Guerrero ............ G07F 17/3213 |
| 2021/0264724 | A1 | 8/2021 | Decasa, Jr. |
| 2022/0005313 | A1 | 1/2022 | Decasa, Jr. |
| 2023/0089842 | A1* | 3/2023 | Daley ................. G07F 17/3211 463/18 |
| 2023/0186734 | A1* | 6/2023 | Krupat ............... G07F 17/3295 463/25 |

OTHER PUBLICATIONS

Notice of Allowance dated Feb. 8, 2022 for U.S. Appl. No. 29/750,832 (pp. 1-9).

Office Action (Non-Final Rejection) dated Jun. 15, 2022 for U.S. Appl. No. 17/389,303 (pp. 1-16).

Office Action (Final Rejection) dated Apr. 7, 2023 for U.S. Appl. No. 17/389,303 (pp. 1-14).

Office Action (Notice of Allowance and Fees Due (PTOL-85)) dated Jul. 21, 2023 for U.S. Appl. No. 17/389,303 (pp. 1-11).

\* cited by examiner

| Reel strip position | Prize Value Reel Strip |
|---|---|
| 1 | Blank |
| 2 | COR |
| 3 | Blank |
| 4 | Blank |
| 5 | Blank |
| 6 | COR |
| 7 | Blank |
| 8 | COR |
| 9 | COR |
| 10 | Blank |
| 11 | Blank |
| 12 | COR |
| 13 | Blank |
| 14 | Blank |
| 15 | COR |
| 16 | Blank |
| 17 | Blank |
| 18 | COR |
| 19 | Blank |
| 20 | Blank |
| 21 | Blank |
| 22 | COR |
| 23 | COR |
| 24 | COR |
| 25 | Blank |
| 26 | Blank |
| 27 | Blank |
| 28 | Blank |
| 29 | COR |
| 30 | Blank |

| Reel strip position | Action Symbol Reel Strip |
|---|---|
| 1 | No Win |
| 2 | Random Prize Selection |
| 3 | Award All Prizes |
| 4 | No Win |
| 5 | No Win |
| 6 | Free Games |
| 7 | Random Prize Selection |
| 8 | No Win |
| 9 | No Win |
| 10 | Award All Prizes |
| 11 | No Win |
| 12 | Random Prize Selection |
| 13 | Random Prize Selection |
| 14 | No Win |
| 15 | Random Prize Selection |
| 16 | No Win |
| 17 | No Win |
| 18 | Random Prize Selection |
| 19 | No Win |
| 20 | Random Prize Selection |
| 21 | No Win |
| 22 | No Win |
| 23 | Award All Prizes |
| 24 | No Win |
| 25 | Random Prize Selection |
| 26 | No Win |
| 27 | Random Prize Selection |
| 28 | No Win |
| 29 | Hold & Spin |
| 30 | No Win |

ELECTRONIC GAMING MACHINE AND SYSTEM WITH A GAME ACTION REEL STRIP CONTROLLING SYMBOL EVALUATION AND SELECTION

RELATED APPLICATIONS

The present application is a continuation of and claims priority to U.S. patent application Ser. No. 17/389,303, filed Jul. 29, 2021, and entitled "An Electronic Gaming Machine and System with a Game Action Reel Strip Controlling Symbol Evaluation and Selection" which claims priority to Australian Patent Application No. 020902684, filed Jul. 30, 2020, and Australian Patent Application No. 2020233681, filed Sep. 16, 2020, all which are hereby incorporated by reference in their entireties.

BACKGROUND

The present application relates to a gaming device, a method of operating a gaming device and a gaming system where a game action symbol is selected from a game action reel strip.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In example embodiments of a gaming device, a method of operating a gaming device and a gaming system, symbols are selected from prize value symbol reel strips and a game action symbol is selected from a game action reel strip which controls at least the next action that will be carried out. In an example, by controlling which of a plurality of sub-routines, a processor will implement one or more available game play options. Examples of next actions include making a further selection of symbols or evaluating the selected prize value symbols, for example by selecting a subset of prize value symbols from which to make an award.

In an embodiment, there is disclosed a gaming device comprising a display, a processor, and a memory storing (a) symbol position data defining a plurality of symbol positions; (b) reel data defining a plurality of reel strips comprising (i) a game action reel strip comprising a plurality of game action symbols, and (ii) one or more prize value symbol reel strips, each comprising prize value symbols at a subset of reel strip positions of the respective reel strip; and (c) computer executable instructions, including instructions for a plurality of different sub-routines associated with respective ones of the game action symbols. When the instructions are executed by the processor, they cause the processor to select symbols from the plurality of reel strips for the plurality of symbol positions including by selecting a game action symbol from the game action reel strip, control the display to display at least each selected prize value symbol and the selected game action symbol at respective symbol positions, execute the sub-routine corresponding to the selected game action symbol, and make any awards resulting from execution of the sub-routine. When a first sub-routine of the plurality of sub-routines is executed, the processor randomly selects a subset of the displayed prize value symbols or a subset of symbol positions and makes an award corresponding to prize values indicated by the selected subset of prize value symbols or symbol positions.

Another embodiment discloses a method of operating a gaming device comprising a display, and a memory storing (a) symbol position data defining a plurality of symbol positions; (b) reel data defining a plurality of reel strips comprising (i) a game action reel strip comprising a plurality of game action symbols, and (ii) one or more prize value symbol reel strips, each comprising prize value symbols at a subset of reel strip positions of the respective reel strip; and (c) computer executable instructions, including instructions for a plurality of different sub-routines associated with respective ones of the game action symbols. The method comprises selecting symbols from the plurality of reel strips for the plurality of symbol positions including by selecting a game action symbol from the game action reel strip, controlling the display to display at least each selected prize value symbol and the selected game action symbol at respective symbol positions, executing the sub-routine corresponding to the selected game action symbol, and making any awards resulting from execution of the sub-routine. Executing a first sub-routine of the plurality of sub-routines comprises randomly selecting a subset of the displayed prize value symbols or symbol positions and making an award comprises making an award corresponding to prize values indicated by the selected subset of prize value symbols or symbol positions.

Another embodiment discloses a system comprising one or more processors; and at least one memory storing (a) symbol position data defining a plurality of symbol positions; (b) reel data defining a plurality of reel strips comprising (i) a game action reel strip comprising a plurality of game action symbols, and (ii) one or more prize value symbol reel strips, each comprising prize value symbols at a subset of reel strip positions of the respective reel strip; and (c) computer executable instructions, including instructions for a plurality of different sub-routines associated with respective ones of the game action symbols. When the instructions are executed by the one or more processors, they cause the one or more processors to select symbols from the plurality of reel strips for the plurality of symbol positions including by selecting a game action symbol from the game action reel strip, control the display to display at least each selected prize value symbol and the selected game action symbol at respective symbol positions, execute the sub-routine corresponding to the selected game action symbol, and make any awards resulting from execution of the sub-routine. When a first sub-routine of the plurality of sub-routines is executed, the one or more processors randomly select a subset of the displayed prize value symbols or symbol positions and make an award corresponding to prize values indicated by the selected subset of prize value symbols or symbol positions.

BRIEF DESCRIPTION OF THE DRAWINGS

FIGS. 3A and 3B illustrate example reel strip layouts.

DETAILED DESCRIPTION

Figure 1:
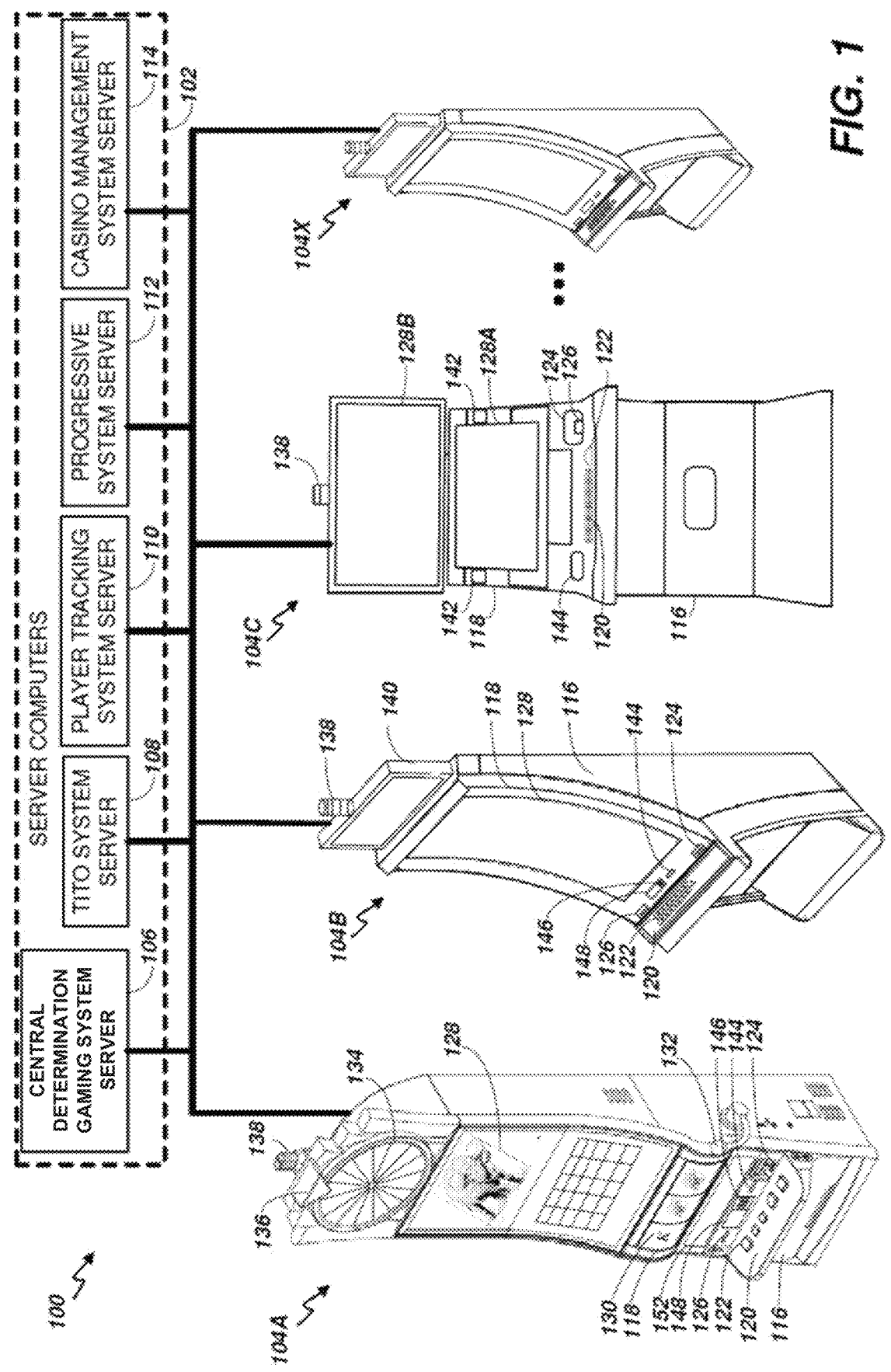
FIG. 1 is an exemplary diagram showing several EGMs networked with various gaming related servers.

Embodiments of the present disclosure represent a technical improvement in the art of electronic gaming machines, systems, and operation of such electronic gaming machines or systems. For example, some embodiments of the present disclosure include a gaming machine that presents in an interactive user interface a reel matrix, where each position of the reel matrix comprises a separate reel strip that may be spun, and an oversized or special reel having a unique reel strip with a plurality of trigger symbols determining features and payouts to be awarded in a game that may also be spun. With each position comprising a reel strip and requiring a selection of prize or values, the number of random combinations generated and analyzed may grow quite large, particularly in relation to conventional reel strips in a standard 3×5 matrix that may involve one or a few random numbers may be needed for symbol selection. One problem faced in the scenario of increasing the number of random numbers generated (e.g., hundreds of random numbers generated) is an increase of game processing and display time if conventional methods are employed to manage a large number of random numbers generated.

Moreover, since this game action feature is not a line/reel game, default win calculations cannot be used. On each spin, based on the symbol spun up on the oversized or special reel, the game processor iterates through remaining symbols and makes the spin result based on the winning symbols.

An improvement disclosed solves the problem of increased random numbers generated (e.g., hundreds of random numbers generated) from having a matrix with each matrix position comprising a reel strip, and the problem of not being able to employ on standard line/reel weighting tables, for example. Improvements disclosed still maintain game processing to present in the user interface the feature without any time lag (i.e., a relatively steady state of game time from pull to outcome), and still achieves a predetermined RTP and regulatory compliance.

As part of locating the oversized or special reel, a challenge is also presented to get unique locations on the reel matrix without having the processor select already discovered locations or positions, and still maintain a rapid response to the player in the display interface. Conventional default weight tables failed to work. As a result, an improvement disclosed solves this problem by deleting an entry of reel spot in the matrix that has already been encountered in the feature game. In other words, instead of using default weight tables, dynamic weight tables, separate from the default weight tables, were employed that modify the weight table dynamically during the selection sequence to delete already encountered reel spots.

By way of a specific example, an enhanced technical capability may be accomplished by driving a processor of the gaming machine to perform a sequence of instructions from multiple discrete game action routines stored in a memory, that randomly assign prize values to a plurality of prize symbols based on a plurality of random numbers generated, in response to a random selection of a plurality of game action symbols from a game action reel strip, that initiate one or more discrete game actions associated with respective game action symbols. These discrete game action routines initiate making of at least one further selection of a quantity of the plurality of symbol positions based on another plurality of random numbers generated, or generating an award amount from the quantity of the prize value symbols displayed in the quantity of the plurality of symbol positions.

Additionally, in some such embodiments, the oversized or special reel is graphically presented and implemented to overcome challenges with fixed screen sizes that are defined and confined by the physical game machine structure. In embodiments contemplated by this disclosure, the game action symbols may, concurrently or subsequently, function to animate special effects on user interface in response to the game action initiated from a selected location in the interface (e.g., the center of the matrix). Such graphical effects on the user interface selectively and efficiently use the available fixed-size display screen of the gaming machine to position the oversized or special reel to enhance visually communicated outcomes while not obscuring the other matrix reel positions. Such an interface allows the player to view the visual effects from the selected location in the interface to appreciate and understand award sizes, differences and gaming actions without being overly burdened by complicated visual movements of the reel strips in each of the matrix positions and related mathematical calculations. The enhanced graphical user interface, in turn, provides improved game presentation in fixed screen configuration to simplify a highly animated matrix, and still providing anticipation characteristics for the player that, in turn, can provide more varied game outcomes.

Such technical solutions are different from conventional games where symbol combinations on pay lines, left-to-right arrangements, right-to-left arrangements, or three/four/five of a kind, are used to determine wins, feature games, or awards. Availability of multiple game actions in response to an associated game action symbol provides refined allocation of game machine hardware resources, improves modularity of games including one or more selections of multiple games under one game umbrella, and increases the potential player interactions with enhanced availability of game actions in a single game instance on the gaming machine, while still achieving a predetermined game RTP and complying with jurisdiction regulations.

Thus, embodiments of the present disclosure are not merely new game rules or simply new display patterns, but provide technologic improvements to computer and graphical user interfaces in the art of electronic gaming machines for such electronic gaming machines. The above example is not intended to be limiting, but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
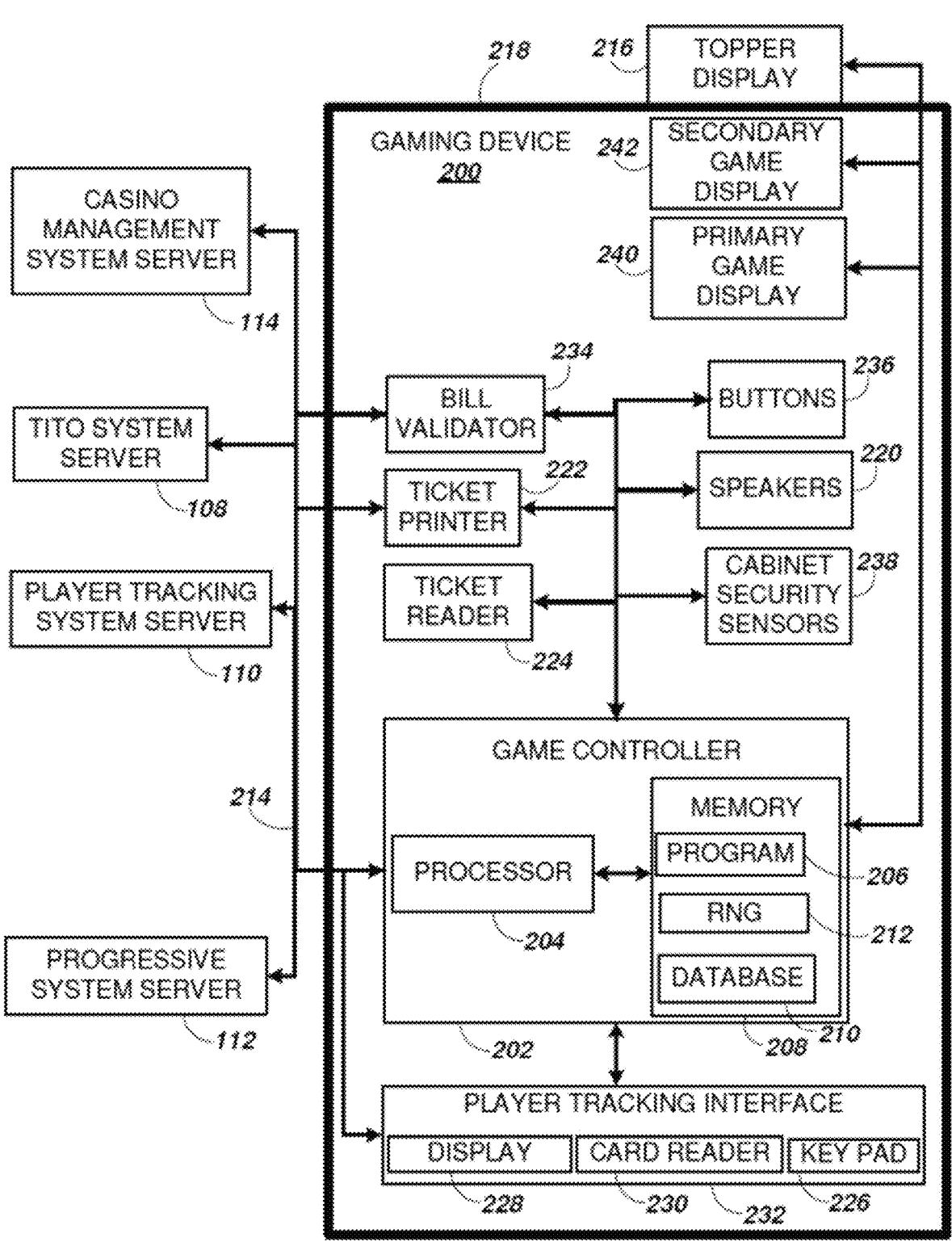
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
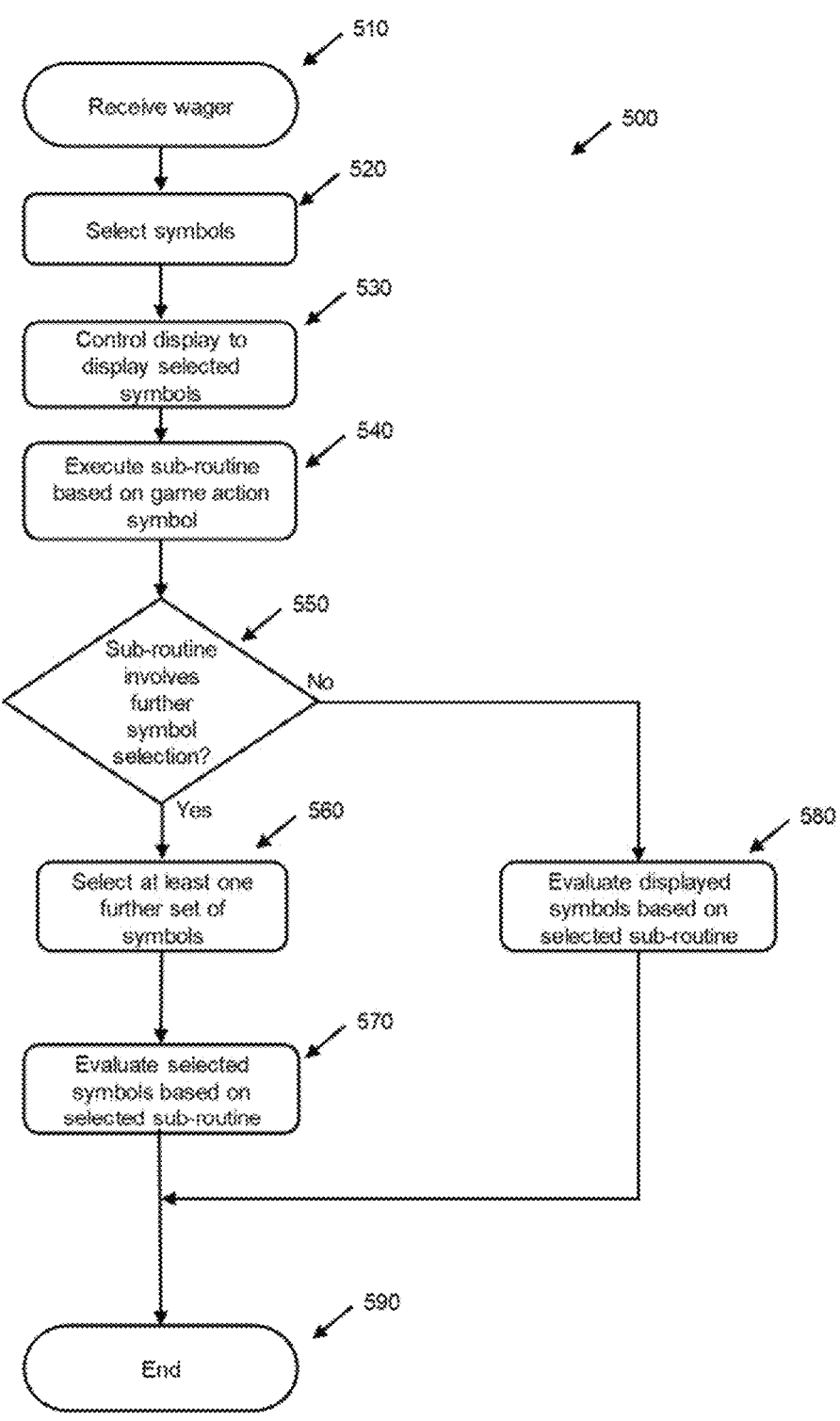
FIG. 5 is a flow chart of a method of operating a gaming system.

FIG. 5 is a flow chart of an embodiment of a method 500 of operating a gaming device. At step 510, the processor 204 receive a wager, for example, in response to the player operating one of the input mechanisms described above.

Figure 6:
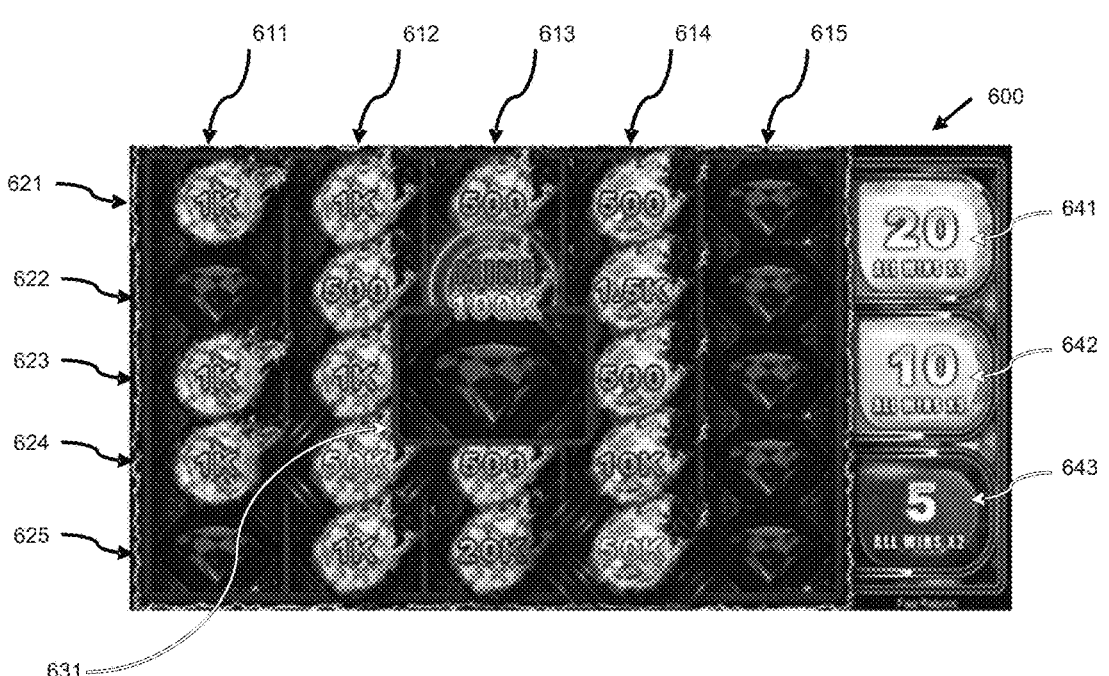
FIGS. 6 to 15 are example screen displays.

The processor 204 selects 520 symbols for display 530 at a set of display positions, in this example (as illustrated in FIG. 6), twenty-five symbol positions arranged in a matrix comprising five columns 611-615 and five rows 621-625, wherein a central symbol position 631, a predetermined symbol position, or a randomly determined symbol position, at least initially, corresponds to a game action reel strip and the other twenty-four symbol positions correspond to prize value reel strips. An example of selecting symbols is illustrated in relation to FIGS. 3A, 3B and 4. In some embodiments, the central symbol position 631, the predetermined symbol position, or the randomly determined symbol position may be graphically larger relative to the remainder of symbol positions.

Figure 3A:
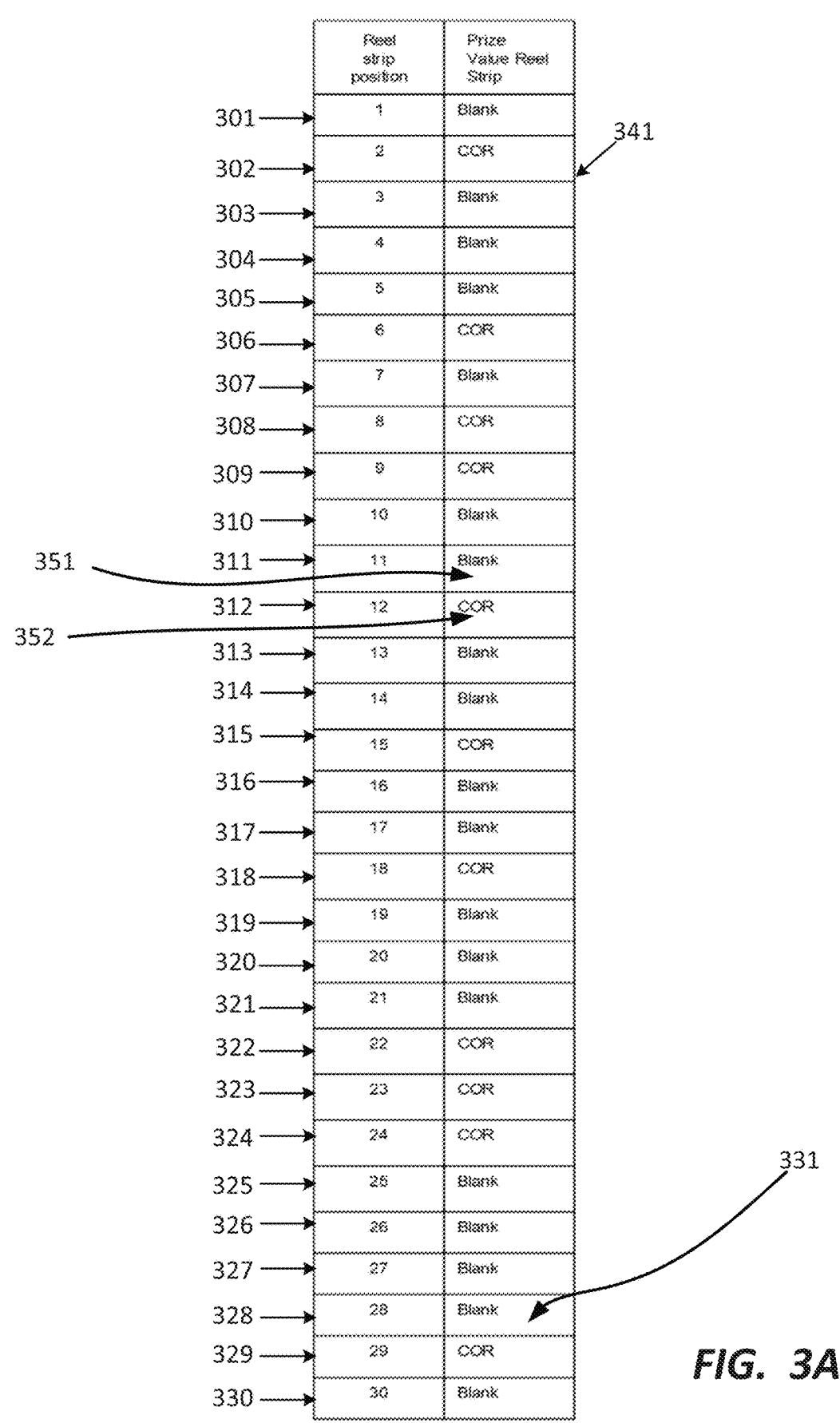

FIG. 3A illustrates an example of a prize value reel strip. In the example, the illustrated prize value reel strip 341 has thirty reel strip positions 301-330. In this example, each reel strip position of each reel is occupied by either prize value symbol also known as a "Cash on Reel" ("COR") symbol (shown as fire ball symbols in FIG. 6) or "Blank" symbols. For example, a "COR" symbol 351 occupies the twelfth reel strip position 312 and a blank symbol 351 occupies the eleventh reel strip position. In the example of FIG. 6, if a "Blank" symbol is selected, no symbol is displayed at the symbol position such that a background in the form of a diamond symbol is visible (that is the blank symbol is effectively transparent). In other examples, the Blank symbol could be visible, for example, it could be a greyed-out fireball symbol with no prize value.

The other prize value symbol reel strips (not shown) vary in terms of number and distribution of COR symbols. In some examples, the lengths of the prize value reel strips also vary. It will be appreciated that these factors control the relative probability of a COR symbol being selected.

In some examples, the values of the cash on reel symbols are fixed. In other example, the values are assigned dynamically in each game instance. In an example, the processor 204 assigns prizes to each of the prize value symbols of each of the prize value reel strips prior to selecting symbols from the prize value reel strips. In this example, this enables the prizes to be seen during at least part of the virtual spinning of the reel strips. In an example, a prize value data structure in memory 208 stores a plurality of weighted tables each comprising a plurality of assignable prizes—i.e. prizes that can be assigned to individual COR symbols. In an example, there are separate weighted tables for each of reel strips. In an example, each weighted table incorporates a plurality of prizes and different weightings are assigned to each prize value in order to control their relative probability of being selected. In some embodiments, a large number of random numbers are generated. A portion of the large number of random numbers are used to select reel stops for the COR symbols and the game action symbol, while remainder of the large number of random numbers is used to assign prizes, prize values, or the cash on reel values to the COR symbols.

In an example, the values of the assignable prizes depend on an amount wagered, for example they correspond to a base amount multiplied by bet multiplier. In an example, the assignable prizes may be credit amounts (e.g. 500, 1000, or 10,000 credits) or otherwise defined prizes such as a bonus or jackpot prizes that have fixed or progressive prize values. In other examples, the prizes may be dollar amounts, e.g. $5, $10, $20, $25.

The instructions in memory 208 cause processor 204 to conduct an iterative loop in which the processor 204 randomly selects one of the prizes using a value obtained from random number generator and assigns it to the next COR symbol in reel strip order until all COR symbols of a reel strip have been assigned a prize. Processor 204 then iterates to the next reel strip and conducts another iterative loop using the weighted table associated with the strip until all reel strips are configured.

In an alternative example, prizes are randomly selected by the processor 204 from a table of prizes without replacement to enable control of the number of instances of one or more prizes.

FIG. 3B is an example of a game action reel strip 342 where the symbols are represented by phrases corresponding to their associated game actions.

The symbols on the game action reel strip 342 are termed game action symbols as they result in the processor 204 taking one of a plurality of available game play actions by executing a relevant sub-routine of instructions stored in memory 308. In one example, the game play actions are: no win, random prize selection, award all prizes, hold and spin, and free games as explained in further detail below.

Figure 4:
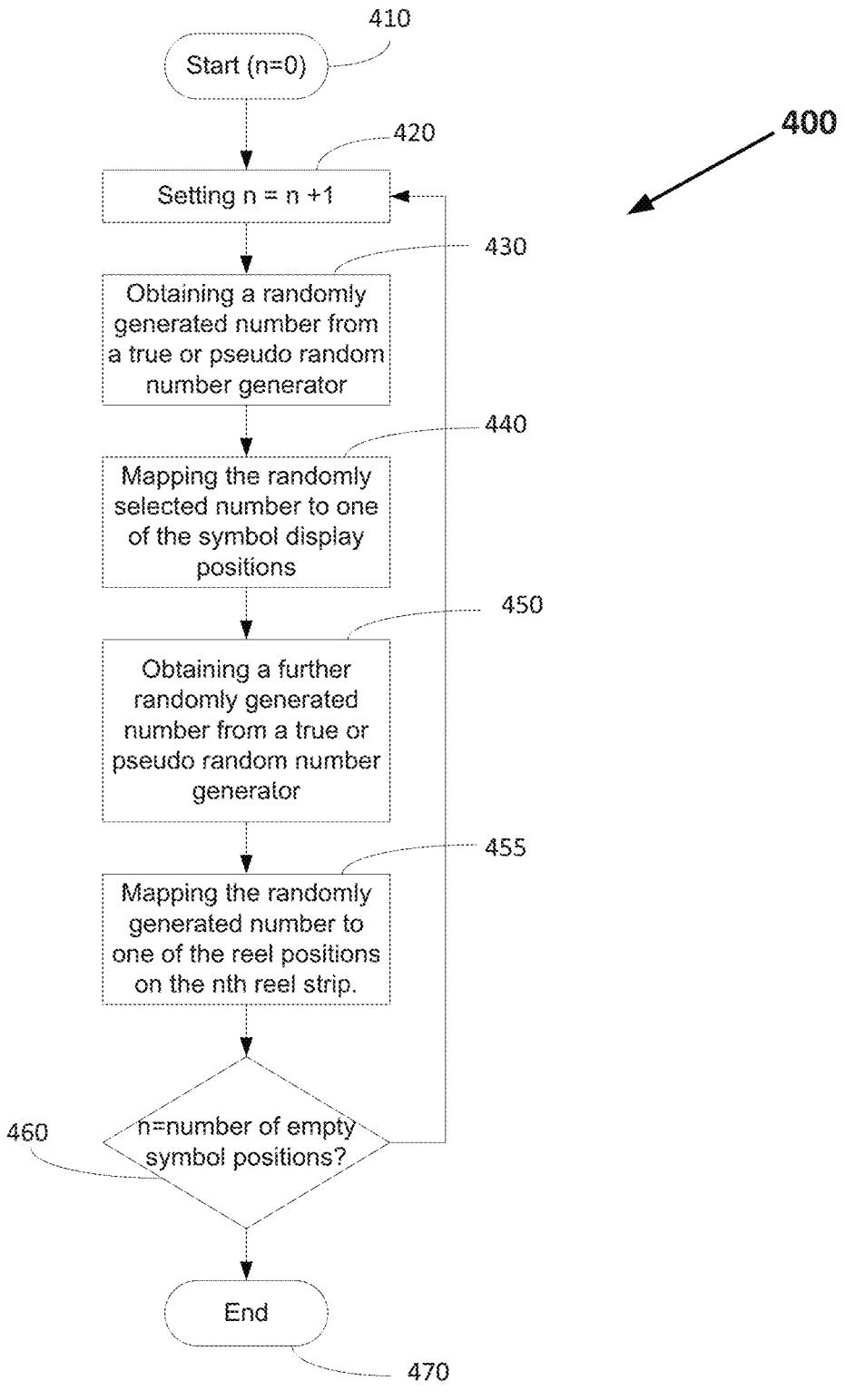
FIG. 4 is a flow chart of a symbol selection method.

FIG. 4 is a flow chart of a method 400 carried out by the processor 204 to select symbols from the prize value reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the display positions in the first to fifth columns (excluding the central position to which the game action symbol will be mapped.) To map the generated number to one of the reel positions, the possible values that can be returned from the RNG 212 are divided into ranges and associated with specific ones of the reel positions in memory 208. In one example, assignment of positions to ranges change as symbol positions are selected so as to prevent reselection of a symbol position that has already been selected.

At step 450, the processor obtains a further randomly generated number from a true or pseudo random number generator 212. At step 455, the processor maps the generated number to reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 455, the processor 204 maps the symbol at the selected reel position to the display position.

At step 460, the processor 460 determines whether symbols have been selected for all of the symbol positions, and if not the processor 204 reverts to step 420 and iterates through steps 430, 440 and 450 until it is determined at step 460 that symbols have been selected for all n symbol positions which the prize value symbol selection process ends 470.

In order to select the game action symbol, the processor 204 obtains a randomly generated number from a true or pseudo random number generator 212. The processor maps the generated number to one of the reel positions of the action reel strip.

After the symbols of all reel strips have been mapped to a symbol position, at step 530 the processor 204 controls display 240 to display them at the symbol positions with the action symbol displayed after the symbols selected for the other symbol positions have been displayed.

At step 540, the processor initiates execution of the sub-routine corresponding to the selected game action symbol. As illustrated in FIG. 5, in this example the sub-routines fall broadly into two categories: a first category where the action symbol affects the evaluation of the already displayed symbols, and a second category where the action symbol results in a further selection of symbols. Accordingly, at step 550 the processor 204 determines whether the sub-routine involves further symbol selection and if not proceed to step 580 and evaluates the displayed symbols based on the selected sub-routine before the process ends at step 590.

If at step 550, the processor 204 determines that the sub-routine involves further symbol selection, the processor 204 proceeds to step 560 and selects at least one further set of symbols in accordance with the selected sub-routine. As exemplified below, in some embodiments, the processor 204 selects more than one further set of symbols.

At step 570, the processor 204 evaluates the selected symbols. Depending on the sub-routine, the evaluation may be performed after each symbol selection or once an evaluation condition is met (e.g. there are no more selections to be conducted). After the conclusion of step 570, the process ends 590.

FIGS. 6 to 15 illustrate examples of sub-routines. FIG. 6 shows an example screen display 600 of an example of a no-win sub-routine where the symbol selected for central display position 631 from the game action reel strip by processor 204 corresponds to no-win being awarded. In this example, the game action symbol for no-win is also a blank symbol on the prize value reel strips, so that a greyed-out diamond background is visible. In this example, the sub-routine is for the processor 204 to proceed to step 590 without making an award. Thus, despite seventeen prize value symbols being displayed (i.e., the fire ball symbols with values on them), no prize is awarded by the processor 204.

Figure 7:
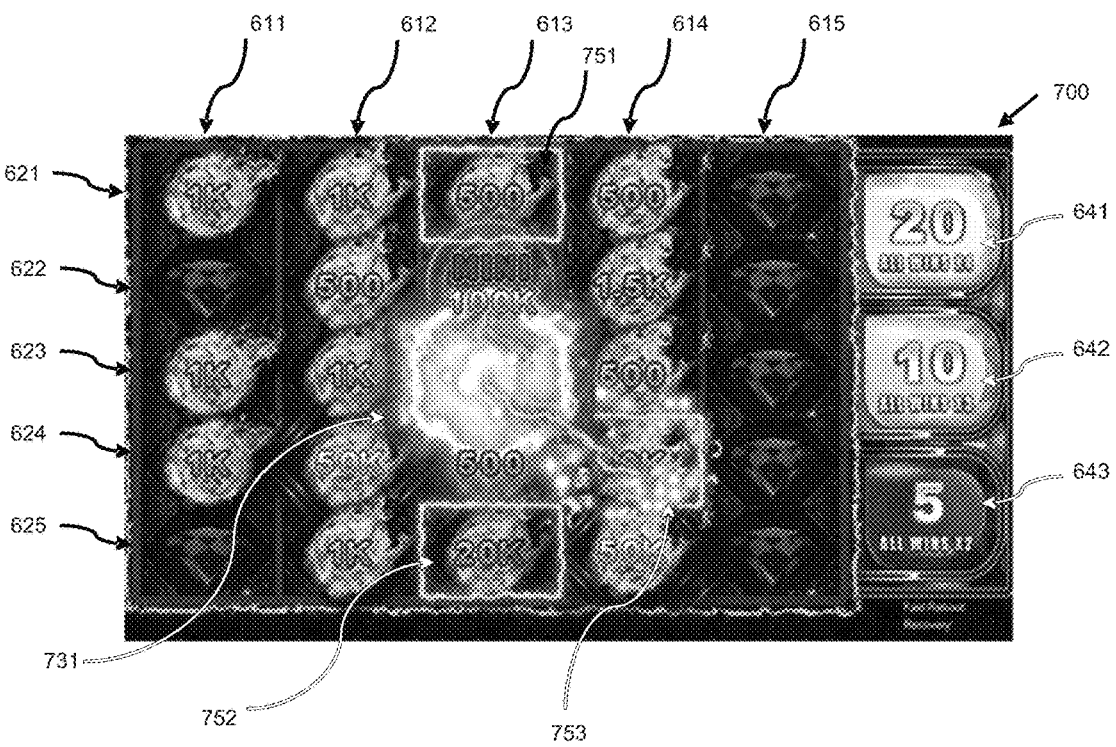

FIG. 7 shows an example screen display 700 of an example of a random win sub-routine where the symbol selected for central display position 731, or any predetermined display position, from the game action reel strip by processor 204 corresponds to a random subset of the displayed prize value symbols being awarded. In this example, the game action symbol for a random prize selection is an animated lightning storm symbol 731. In this example, when executing the random prize selection sub-routine the processor 204 first selects a number of prizes to award, for example, 2, 3 or 4 prizes by obtaining a random number from random number generator 212 and mapping the random number to one of 2, 3, or 4 prizes. In other examples, the number of prizes to award may be fixed. The processor 204 then performs the selected number of selections from among the displayed prize symbols. In one example, processor 204 generates a list of symbol positions having unselected prize value symbols, obtains a random number from random number generator 212, and maps the random number to one of the symbol positions in the list. The processor 204 then removes the selected symbol position from the list before performing another selection. Processor 204 repeats the symbol selection process until all symbol positions have been selected. Processor 204 then controls the display 240 to display an animation of lightning strikes hitting the symbol positions to indicate which prizes are to be awarded and updates a win meter to reflect the total prize value of the selected prize value symbols. In this regard, generating random display position coordinates to animate the lightning strikes overcomes a number of technical challenges, for example, without striking the same symbol repeatedly, and enhances speeds at which display positions are discovered or struck as follows. In some embodiments, one or more game side weight tables may be modified dynamically. In other embodiments, entries in the one or more weight tables may be removed such that accessing remaining entries in the one or more weight tables may be sped up. In another example (not shown), when executing the random prize selection, the processor 204 selects symbol positions, instead of displayed prize value symbols, regardless of whether the display positions displays a prize value symbol or not. It is therefore possible for the processor 204 to select one or more blank positions, each of which contributes a zero prize value to the win meter. Thus, in this regard, unlike any conventional gaming mechanics where pay lines and/or pay tables are used to determine winnings and awards, the game action symbol determines whether feature games, such as hold and spin, are triggered, a win occurs, or an award is awarded. For example, on each spin, based on the game action symbol spun up in a predetermined display position or symbol position, the game may iterate through remainder of the plurality of display positions or symbol positions, and determine a spin result or an award amount, based on symbols selected via the game action symbol. Thus, in some embodiments, line wins, way wins, left to right, right to left, multiple of a kind, or any other graphical representation constituting a winning combination are all absent from the gaming mechanics, and a win may only be achieved when a unique game action symbol lands in the predetermined symbol position or reel, and when unique game action symbol randomly shoots on to, or activates one or more awards of other reels or symbol positions that have landed prizes.

In FIG. 7 there are also shown possible free game awards 641-643 to indicate to the player that they could be awarded 20 free games where all wins are multiplied by four 641, ten free games where all wins are multiplied by three 642, or five free games where all wins are multiplied by two 643.

Figure 8:
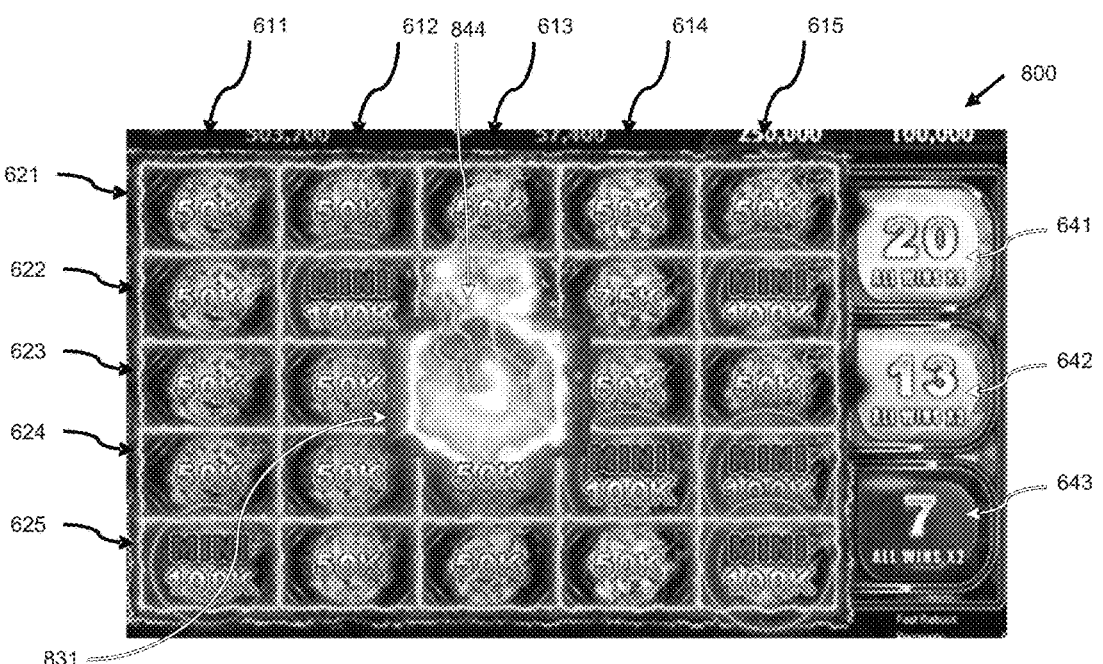

FIG. 8 shows an example screen display 800 where the selected game action symbol 831 corresponds to a sub-routine where processor 204 awards all the prizes shown on the prize value symbols. In this example, the game action symbol is also an animated lighting storm symbol with the animation controlled to appear more active than the animated symbol when a subset of prizes are awarded to indicate that all of the displayed prizes are to be awarded. In this example, there are prize value symbols at all but one 844 of the symbol positions and their values are added by processor 204 to the win meter. As shown in FIG. 8, possible free game awards 641-643 indicate to the player that 20 free games where all wins are multiplied by four 641, thirteen free games where all wins are multiplied by three 642, or seven free games where all wins are multiplied by two 643 could be awarded.

Figure 9:
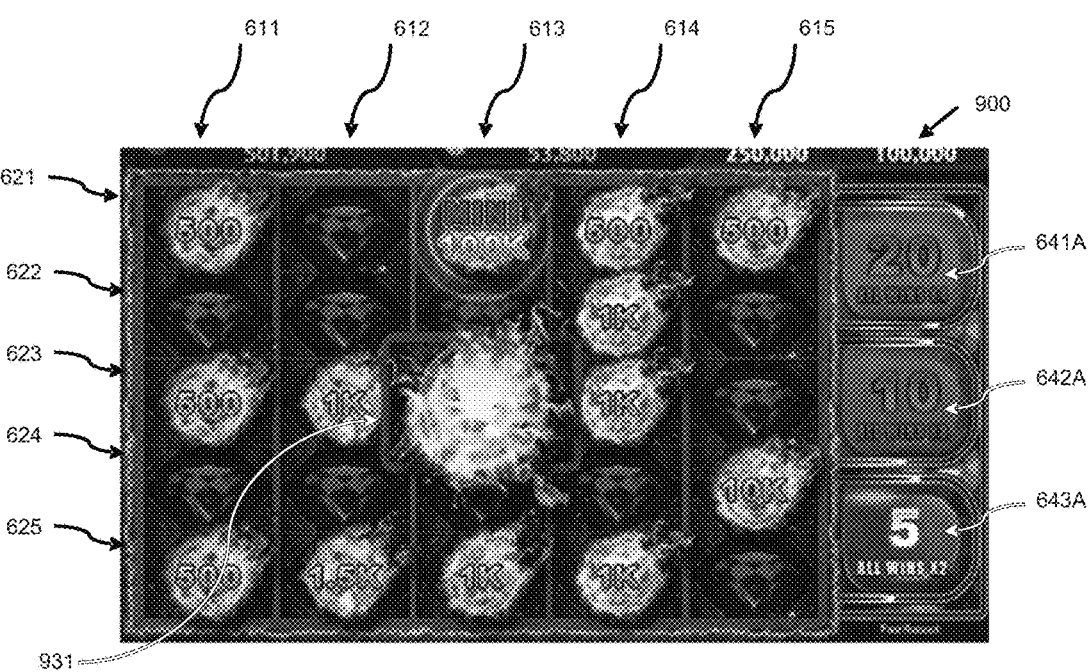

FIG. 9 shows an example screen display 900 where the selected game action symbol is a fireball symbol 931 that corresponds to a sub-routine where processor 204 initiates a hold and spin feature. It will be observed from the greyed out free game indicators 641A, 642A and the updated free game counter 643A that the hold and spin feature has been awarded within a free game feature with five free games remaining. In some embodiments, there may be multiple sets of features that can be triggered by the game. However, some or all of the multiple sets of features differentiated by multiple variables, including number of games and multiplier values, are randomly selected or awarded, or not selectable by a player.

Figure 10:
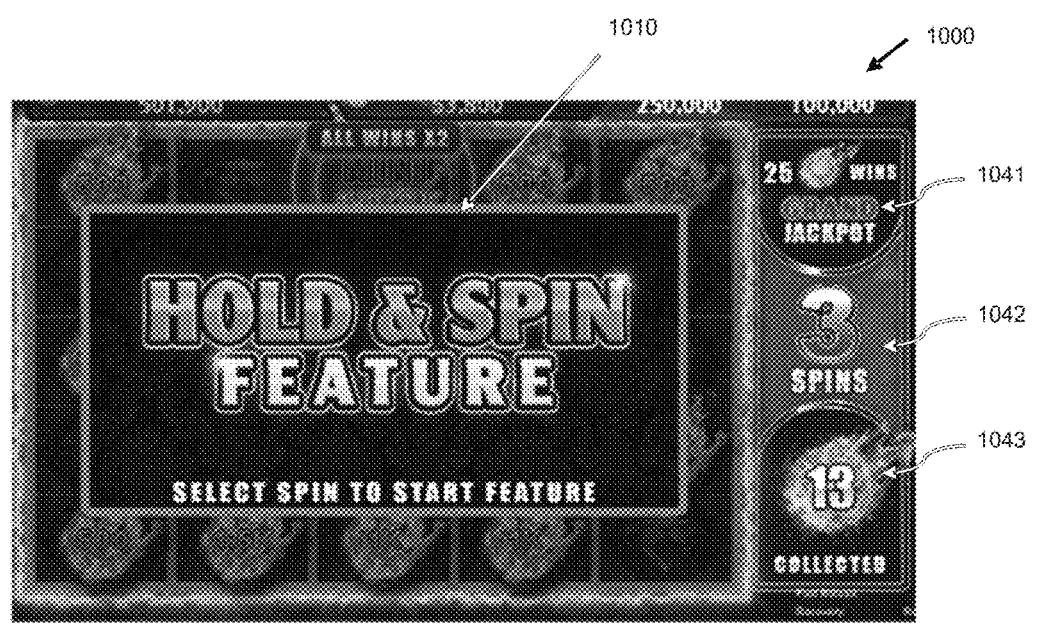

FIG. 10 is an example transition screen display (e.g., transitioning from the example screen display 900 of FIG. 9) with a message 1010 indicating the award of the hold and spin feature. The free games indicators 641-643 have been replaced by information relating to the hold and spin feature including: a message 1041 indicating that collecting 25 prize value symbols wins a Grand Jackpot Prize; a spin counter 1042 indicating that the player currently has three spins in the hold and spin feature, and a prize value symbol counter 1043 indicating that the player has currently collected 13 prize value symbols.

Figure 11:
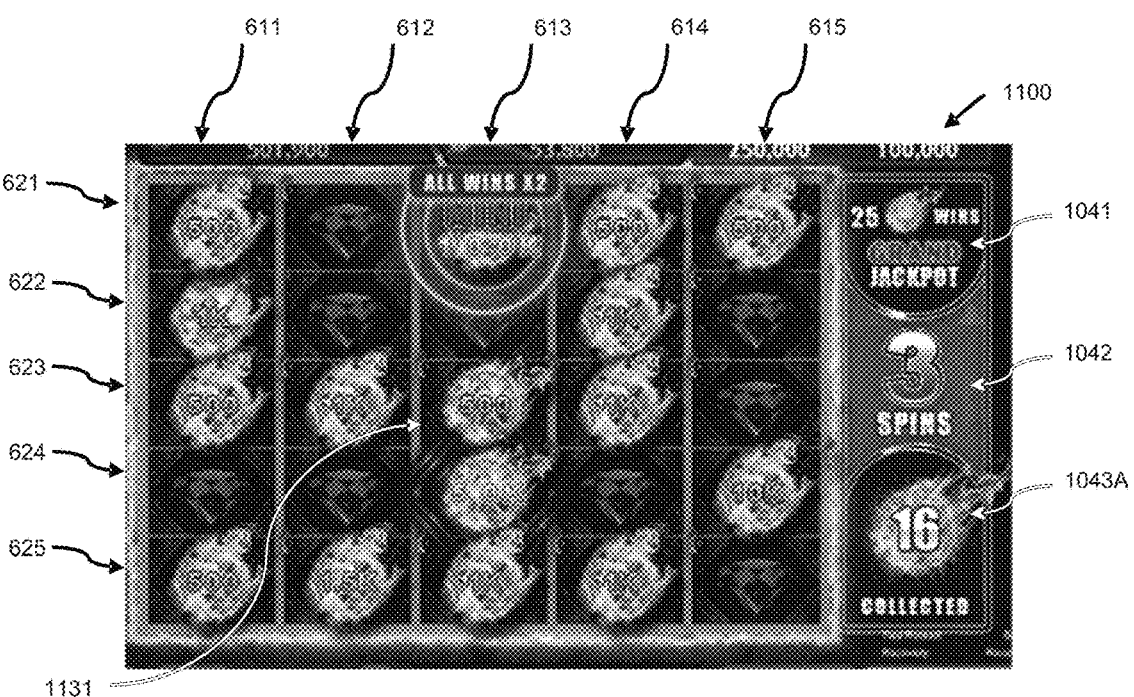

FIG. 11 is an example screen display 1100 during the hold and spin feature. From FIG. 11, it will be apparent that the central symbol position 1131 has changed to be the same as all of the other symbol positions. During the hold a spin feature, symbols are selected solely from the prize value reel strips for symbol positions at which a prize value symbol (e.g., from the prize value reel strip 341 of FIG. 3A) is not already displayed including the central symbol positions 1131—i.e. symbol positions where a prize value symbol has not been held from a previous game round. That is, the game action reel strip is not used during the hold and spin feature and symbols are selected in accordance with the process described in relation to FIGS. 3A and 4 above. As shown by updated symbol collection counter 1043A, each time a prize value symbol is selected for a symbol position, the counter 1043A is updated to reflect each additional collected symbol, such that in FIG. 11, the number of collected symbols is sixteen. These sixteen symbols are held in place and symbols will only be selected for the remaining nine symbol display positions. In this example, each time a prize value symbol is selected, the spin counter 1042 is reset to three spins. The hold and spin feature continues until all spins have been completed or prize value symbols fill all symbol positions and the Grand Jackpot is awarded.

It will thus be appreciated that the hold and spin feature involves at least one additional selection of symbols (i.e. the case where all symbol positions are filled in a first hold and spin game instance).

Figure 12:
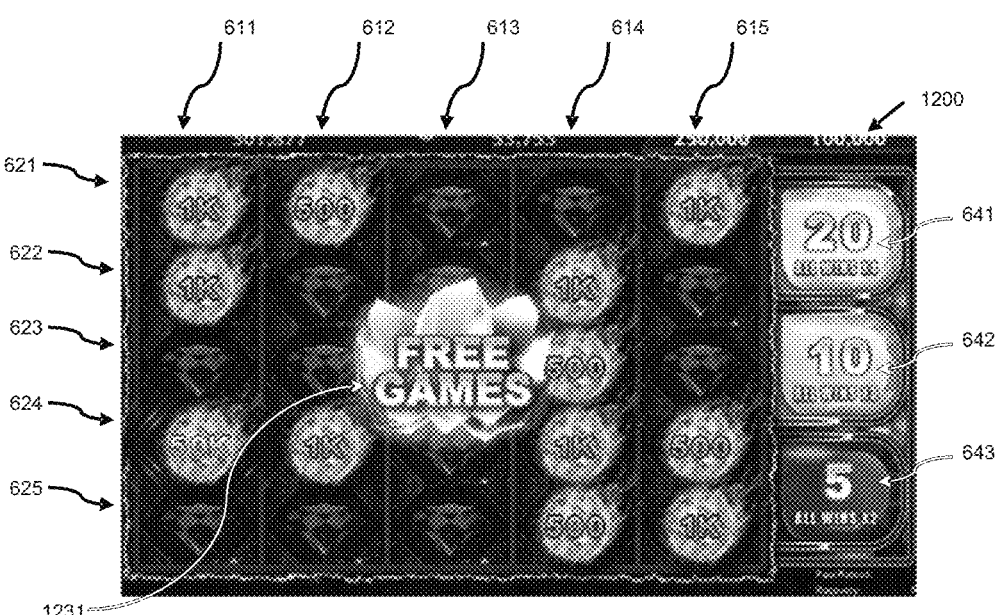

FIG. 12 is an example screen display 1200 of a game instance where a free games action symbol 1231 has been selected by processor 204 from game actions symbol reel strip.

Figure 13:
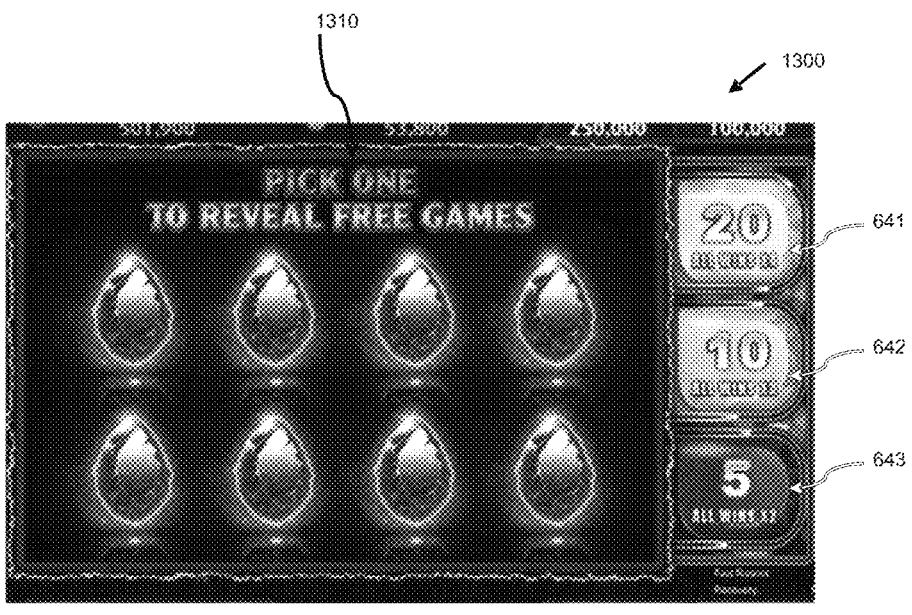

FIG. 13 is an example first transitional screen display 1300 of a free games feature where a player is presented with a selection screen and they operate an input device in order to select one of the symbols.

Figure 14:

FIG. 14 is an example second transitional screen display 1400 of a free games feature where a player is presented with the result of the selections, here a message 1410 that five free games are awarded. In this respect, it will be noted that the upper two possible free game award 641A, 641B have been greyed-out to reflect the award. In each awarded free game a further set of symbols is selected by processor 204 using the process outlined in respect of FIGS. 3A, 3B and 4 above. In the example, the same game action symbol reel strip used during the free games is the same as in the initial game instance such that game outcomes generated during the free game series will be similar to those shown in FIGS. 6 to 9 and 12. In other examples, the game action symbol reels strip can be different, for example, to remove the possibility of a further series of free games being awarded.

Figure 15:
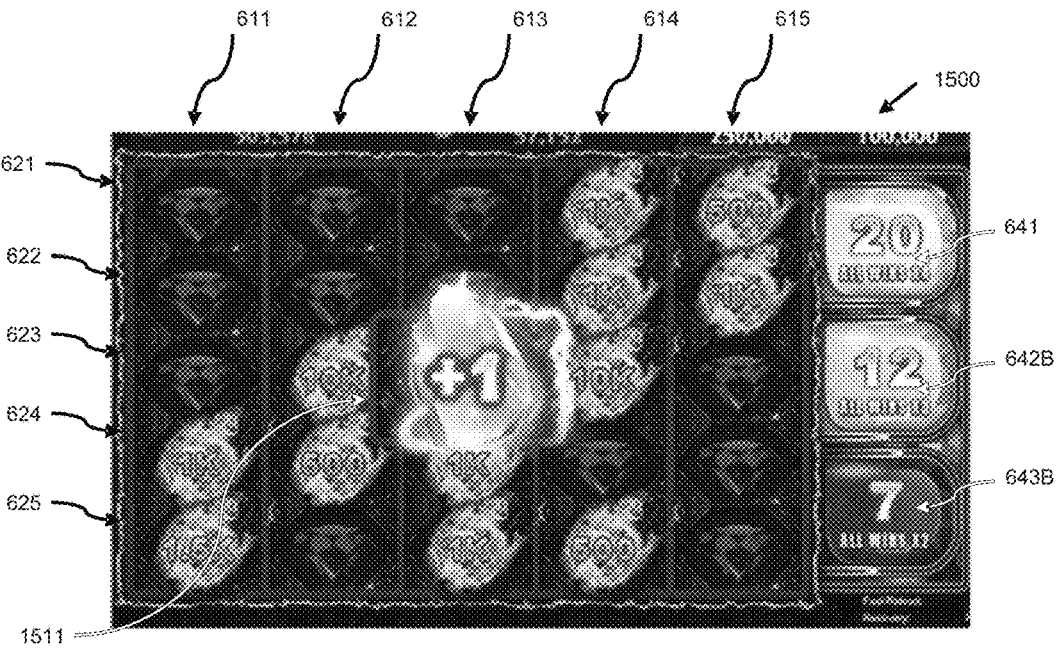

It will be appreciated that a different game action symbols can be used on different game action symbol reels strips. FIG. 15 is an example screen display 1500 showing a further example of a selection of an alternative game action symbol in the form of a free game increment symbol 1511. In this example, there are specific free game increment symbols corresponding to each of the possible free game awards 641-642. In the example screen display the awards have been incremented by processor 204 responsive to selection of increment symbols such that there is now an available award of 12 free games with all wins multiplied by three 642B and an available award of seven games with all wins multiplied by two 643B.

Example Embodiments

In an example embodiment, there is provided a gaming device comprising: a display; a processor; and a memory storing (a) symbol position data defining a plurality of symbol positions; (b) reel data defining a plurality of reel strips comprising (i) a game action reel strip comprising a plurality of game action symbols, and (ii) one or more prize value symbol reel strips, each comprising prize value symbols at a subset of reel strip positions of the respective reel strip; and (c) computer executable instructions, including instructions for a plurality of different sub-routines associated with respective ones of the game action symbols, wherein when the instructions are executed by the processor, they cause the processor to: select symbols from the plurality of reel strips for the plurality of symbol positions including by selecting a game action symbol from the game action reel strip; control the display to display at least each selected prize value symbol and the selected game action symbol at respective symbol positions; and execute the sub-routine corresponding to the selected game action symbol, wherein when at least a first sub-routine of the plurality of sub-routines is executed, the processor makes an award corresponding to at least some of the prize values indicated by the displayed prize value symbols, and wherein when at least a second sub-routine of the plurality of sub-routines is executed, the processor makes at least one further selection of symbols from the plurality of reel strips for the plurality of symbol positions and evaluates the selected symbols of the at least one further selection to determine whether to make an award.

In another example embodiment, there is provided a method of operating a gaming device comprising a display, and a memory storing (a) symbol position data defining a plurality of symbol positions; (b) reel data defining a plurality of reel strips comprising (i) a game action reel strip comprising a plurality of game action symbols, and (ii) one or more prize value symbol reel strips, each comprising prize value symbols at a subset of reel strip positions of the respective reel strip; and (c) computer executable instructions, including instructions for a plurality of different sub-routines associated with respective ones of the game action symbols. The method comprises: selecting symbols from the plurality of reel strips for the plurality of symbol positions including by selecting a game action symbol from the game action reel strip; controlling the display to display at least each selected prize value symbol and the selected game action symbol at respective symbol positions; and executing the sub-routine corresponding to the selected game action symbol, wherein when at least a first sub-routine of the plurality of sub-routines is executed, the processor makes an award corresponding to at least some of the prize values indicated by the displayed prize value symbols, and wherein when at least a second sub-routine of the plurality of sub-routines is executed, the processor makes at least one further selection of symbols from the plurality of reel strips for the plurality of symbol positions and evaluates the selected symbols of the at least one further selection to determine whether to make an award.

In another example embodiment, there is provided a system comprising: one or more processors; and at least one memory storing (a) symbol position data defining a plurality of symbol positions; (b) reel data defining a plurality of reel strips comprising (i) a game action reel strip comprising a plurality of game action symbols, and (ii) one or more prize value symbol reel strips, each comprising prize value symbols at a subset of reel strip positions of the respective reel strip; and (c) computer executable instructions, including instructions for a plurality of different sub-routines associated with respective ones of the game action symbols, wherein when the instructions are executed by the one or more processors, they cause the one or more processors to: select symbols from the plurality of reel strips for the plurality of symbol positions including by selecting a game action symbol from the game action reel strip; control the display to display at least each selected prize value symbol and the selected game action symbol at respective symbol positions; and execute the sub-routine corresponding to the selected game action symbol, wherein when at least a first sub-routine of the plurality of sub-routines is executed, the one or more processors make an award corresponding to at least some of the prize values indicated by the displayed prize value symbols, and wherein when at least a second sub-routine of the plurality of sub-routines is executed, the one or more processors make at least one further selection of symbols from the plurality of reel strips for the plurality of symbol positions and evaluate the selected symbols of the at least one further selection to determine whether to make an award.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:
   at least one server; and
   a gaming device coupled to the at least one server and having a display that provides a plurality of display positions, a device processor and memory storing data indicative of a set of symbols having a plurality of prize symbols and a plurality of game action symbols, and a plurality of instructions, which, when executed, cause the device processor to at least:
     receive, from the at least one server, data indicative of an awardable prize,
     animate a plurality of symbols being randomly selected for the plurality of display positions selected based on dividing random numbers generated by a random number generator into ranges and associating the ranges with display positions in dynamic weight tables that modify during selection by deleting an entry in the dynamic weight tables that corresponds to an already-selected display position and changing the ranges after the entry is deleted, in response to a first game action symbol being displayed at a first display position among the plurality of display positions, animate a first game action associated with the first game action symbol visually iterating through one prize symbol followed by another prize symbol within a selected subset of the plurality of prize symbols displayed in the plurality of display positions selected from a remainder of the plurality of display positions to animate graphical effects indicative of one or more prizes associated with the plurality of prize symbols in the selected subset of the plurality of prize symbols, and animate an award amount representing the awardable prize received when the selected subset of the plurality of prize symbols selected have been visually iterated.

2. The electronic gaming system of claim 1, wherein the plurality of instructions, when executed, cause the device processor to animate on the display the first game action symbol striking each of the plurality of prize symbols while iterating through the plurality of prize symbols displayed in the plurality of display positions selected from the remainder of the plurality of display positions.

3. The electronic gaming system of claim 1, wherein the plurality of instructions, when executed, cause the device processor to animate the first game action visually iterating through the plurality of prize symbols displayed in the plurality of display positions selected in a predetermined order.

4. The electronic gaming system of claim 1, wherein the plurality of instructions, when executed, cause the device processor to iterate through a selected quantity of the plurality of display positions from the remainder of the plurality of display positions when the first game action symbol is displayed.

5. The electronic gaming system of claim 1, wherein the plurality of instructions, when executed, cause the device processor to update a win meter to reflect the award amount animated.

6. The electronic gaming system of claim 1, wherein the plurality of instructions, when executed, cause the device processor to increment a counter for all of the plurality of prize symbols displayed.

7. A method of operating an electronic gaming system comprising a gaming device having a display that provides a plurality of display positions, a device processor and memory storing data indicative of a set of symbols having a plurality of prize symbols and a plurality of game action symbols, the method comprising:

transmitting, from at least one server, data indicative of an awardable prize;

animating, at a first display position of a plurality of display positions, a first game action symbol being selected;

animating at a remainder of the plurality of display positions a subset of prize symbols being randomly selected based on dividing random numbers generated by a random number generator into ranges and associating the ranges with display positions in dynamic weight tables that modify during selection by deleting an entry in the dynamic weight tables that corresponds to an already-selected display position and changing the ranges after the entry is deleted;

animating graphical effects indicative of a first game action associated with the first game action symbol visually iterating through one prize symbol followed by another prize symbol within a selected subset of prize symbols displayed to award one or more prizes associated with the plurality of prize symbols; and animating an award amount representing the awardable prize received when the selected subset of the plurality of prize symbols displayed have been visually iterated.

8. The method of claim 7, further comprising animating the first game action symbol striking each of the plurality of prize symbols in the subset of prize symbols while iterating through the subset of prize symbols displayed in the plurality of display positions selected from the remainder of the plurality of display positions.

9. The method of claim 7, wherein the plurality of prize symbols further includes at least one blank symbol.

10. The method of claim 7, further comprising animating the first game action visually iterating through the subset of prize symbols displayed in the plurality of display positions selected in a predetermined order.

11. The method of claim 7, wherein the selected subset of the plurality of prize symbols displayed comprises a selected quantity of display positions from the remainder of the plurality of display positions when the first game action symbol is displayed.

12. The method of claim 7, further comprising updating a win meter to reflect the award amount animated.

13. The method of claim 7, further comprising animating visually incrementing a counter for all of the plurality of prize symbols displayed.

14. A non-transitory computer-readable medium comprising data indicative of a set of symbols having a plurality of prize symbols including at least one blank symbol and a plurality of game action symbols, and a plurality of device instructions for use with a remote gaming device that comprises a plurality of display positions and a device processor, and the device instructions, which, when executed, cause the device processor to perform the steps of:

receiving, from at least one server, data indicative of an awardable prize;

animating at a first display position of the plurality of display positions a first game action symbol being selected;

animating at a subset of a remainder of the plurality of display positions a subset of prize symbols being randomly selected based dividing random numbers generated by a random number generator into ranges and associating the ranges with display positions in dynamic weight tables that modify during selection by deleting an entry in the dynamic weight tables that corresponds to an already-selected display position and changing the ranges after the entry is deleted;

animating graphical effects indicative of a first game action associated with the first game action symbol visually iterating through one prize symbol followed by another prize symbol within a selected subset of prize symbols displayed in the plurality of display positions selected to award one or more prizes associated with the subset of prize symbols; and controlling the remote gaming device to present an award amount representing the awardable prize received when the selected subset of the plurality of prize symbols selected have been visually iterated.

15. The non-transitory computer-readable medium of claim 14, wherein the plurality of device instructions, when executed, cause the device processor to perform the step of animating the first game action symbol striking the subset of prize symbols while iterating through the subset of prize symbols displayed in the plurality of display positions selected from the remainder of the plurality of display positions.

16. The non-transitory computer-readable medium of claim 14, wherein the plurality of device instructions, when executed, cause the device processor to perform the step of animating the first game action visually iterating through the subset of prize symbols displayed in the plurality of display positions selected in a predetermined order.

17. The non-transitory computer-readable medium of claim 14, wherein the plurality of device instructions, when executed, cause the device processor to perform the step of iterating through a selected quantity of display positions from the remainder of the plurality of display positions when the first game action symbol is displayed.

18. The non-transitory computer-readable medium of claim 14, wherein the plurality of device instructions, when executed, cause the device processor to perform the step of updating a win meter to reflect the award amount animated.

19. The non-transitory computer-readable medium of claim 14, wherein the plurality of device instructions, when executed, cause the device processor to perform the step of animating visually incrementing a counter for all of the plurality of prize symbols displayed in the subset of prize symbols.

\* \* \* \* \*